United States Patent [19]

Graham et al.

[11] 3,837,136

[45] Sept. 24, 1974

[54] DEVICES FOR CONNECTING TWO PLATES

[75] Inventors: Francis David Graham, Cedar Grove; Maurice Cyril Bryceland, Denville, both of N.J.

[73] Assignee: Swisslok Company, Parsippany, N.J.

[22] Filed: July 19, 1972

[21] Appl. No.: 272,867

[52] U.S. Cl. .................................. 52/760, 85/7
[51] Int. Cl. ............................................ F16b 19/00
[58] Field of Search .......... 287/189.36 D, 189.36 F, 287/189.36 C, 20.92 C, 20.92 D, 20.92 J, 20.924, 20.92 E, 189.35; 85/7, 11, 15

[56] References Cited
UNITED STATES PATENTS

| | | | |
|---|---|---|---|
| 2,386,887 | 10/1945 | Eckel | 287/189.35 X |
| 2,576,396 | 11/1951 | Green | 287/189.35 X |
| 3,390,856 | 7/1968 | VanBuren | 287/189.35 X |
| 3,511,525 | 5/1970 | Friedling et al | 287/189.36 D |

*Primary Examiner*—Jordan Franklin
*Assistant Examiner*—Wayne L. Shedd
*Attorney, Agent, or Firm*—Shapiro and Shapiro

[57] ABSTRACT

A device for connecting two plates in substantially perpendicular relationship comprises a shank and a head. The shank is intended to be inserted into an opening in a first plate and the head acts to limit the insertion of the device into the opening. The shank is provided with a slot which is adapted to receive a marginal portion of a second plate. The slot is widened in the vicinity of its base and the base is spaced from the head so that upon the maximum insertion of the shank in the opening to correspond to an abutment position of the head and the first plate and an abutment position of two plates, the portion of the second plate received in the slot will be locally deformed in the area of the base to increase its lateral dimension and thereby connect the two plates.

The devices are stamped or blanked from flat strip stock. In one enbodiment, the device is a flat piece which is accommodated by a rectangular opening. In another embodiment, a pair of parallel shanks are connected to one another to double the holding strength of the device. In addition, round or circular openings may be provided in the plate through which the shanks of the devices are inserted.

7 Claims, 7 Drawing Figures

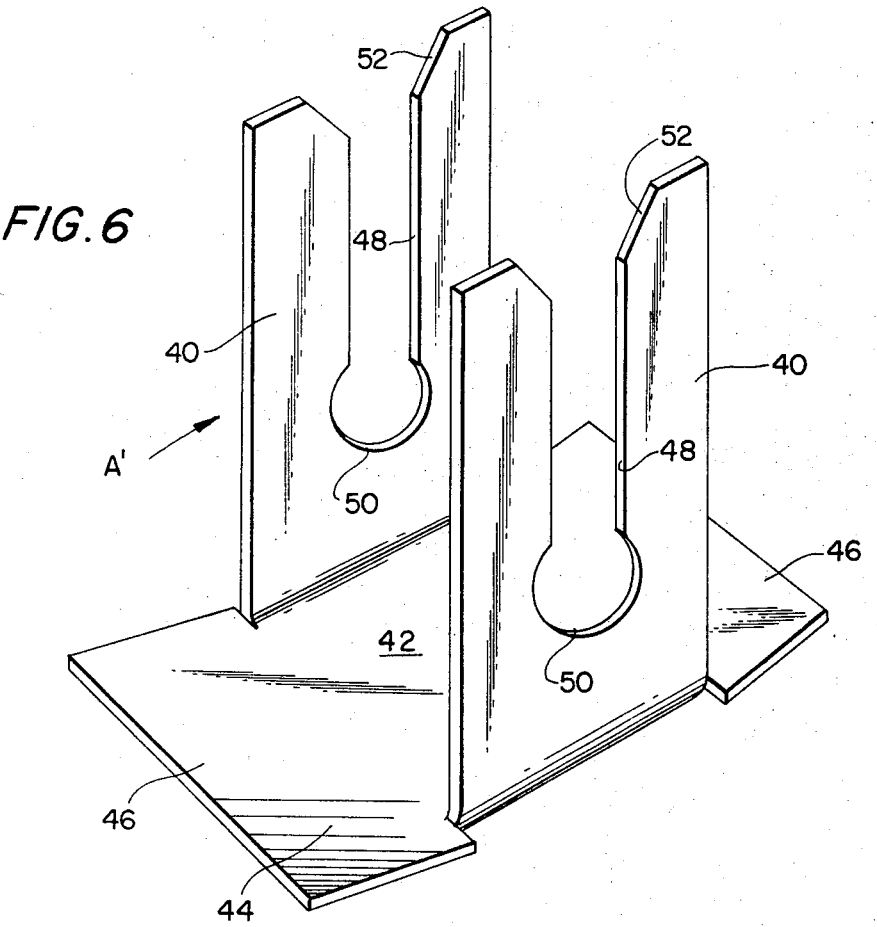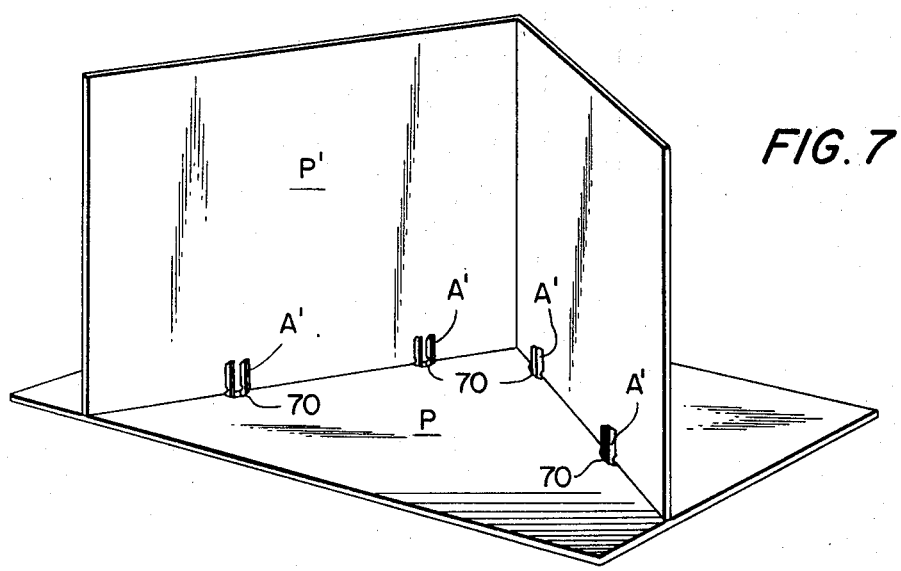

DEVICES FOR CONNECTING TWO PLATES

The invention is directed to improvements in devices of the kind capable of connecting two plates in substantially perpendicular relationship.

BACKGROUND OF THE INVENTION

Friedling et al., U.S. Pat. No. 3,511,525 granted May 12, 1970, discloses a fastening device which effectively connects a pair of plates in substantially perpendicular relationship by the simple expedient of inserting the slotted shank of the device in an opening in one plate, inserting the second plate in the slot, and then hammering the head of the device to the point to where the head engages or abuts the plate having the opening. Due to the slot having a widened base, the edge of the second plate is deformed and held by the fastening device in the area of the widened base. The fastener is of a harder material than the material of the plate which is deformed in the area of the widened base.

Though the Friedling et al. device is functionally satisfactory, the high cost of manufacturing the product has limited its use. It is made from rod or round bar stock, and requires careful and costly machining operations and a heading operation. Selling price is an important factor in most industries, and this fact is particularly true in the fastener industry.

The primary object of the invention is to provide a device of the kind under consideration which can be manufactured for considerably less than the prior art devices of this kind, while providing a product which is functionally suitable to readily and easily fasten or connect two plates in substantially perpendicular relationship.

Another object of the invention is to provide simple and economical methods for making devices of the kind under consideration.

These, and other objects and advantages of the invention will be apparent from the following detailed description of several preferred embodiments of the invention.

SUMMARY OF THE INVENTION

A device for connecting two plates in substantially perpendicular relationship comprises a shank which is adapted to be inserted into an opening in a first plate and a head adapted to limit the insertion of the shank into the opening. To enable the product to be manufactured at a minimal cost the shank and the head are integrally formed from flat strip stock. The shank is provided with a slot which is adapted to receive a marginal portion of a second plate, and the slot is shaped so that it is widened in the vicinity of its base. The base of the slot is spaced from the head a predetermined distance so that upon the maximum insertion of the shank in the opening to correspond to an abutment position of the head and the first plate, also an abutment position of the two plates, the portion of the second plate which is received in the slot is locally deformed in the area of the base to increase its lateral dimension and thereby connect the plates to one another.

In one embodiment of the invention the device is flat. The head comprises a projection extending laterally from each side of the shank and the head has at least one dimension which is substantially equal to the thickness of the shank. Also, the head has opposite sides which lie substantially in the same plane as the faces of the shank, the faces of the shank being substantially parallel with one another.

In another embodiment of the invention the holding power of the device may be doubled by making the device with two shanks. The shanks are integrally connected to one another by a bridging portion. The shanks are similarly slotted with the slots widened in the vicinity of the base and the base of each slot spaced the same distance from the head.

In accordance with the methods of the invention a continuous strip of a hard metal is subjected to punching operations to remove substantially keyhole shaped sections in substantially equally spaced relationship and to remove substantially rectangularly shaped sections which are spaced from the keyhole shaped sections at regular intervals. These punching operations are preferably accomplished in a progressive die. The punched strip is then severed at regular intervals to provide the described devices having the slotted shank and the integrally formed head.

BRIEF DESCRIPTION OF THE DRAWINGS

FIG. 6 is an enlarged perspective view of the device made in accordance with the method of manufacture illustrated in FIG. 5; and FIG. 7 is a perspective view showing the device of FIG. 6 as used to connect a plurality of plates.

DESCRIPTION OF THE PREFERRED EMBODIMENTS

Figure 1:
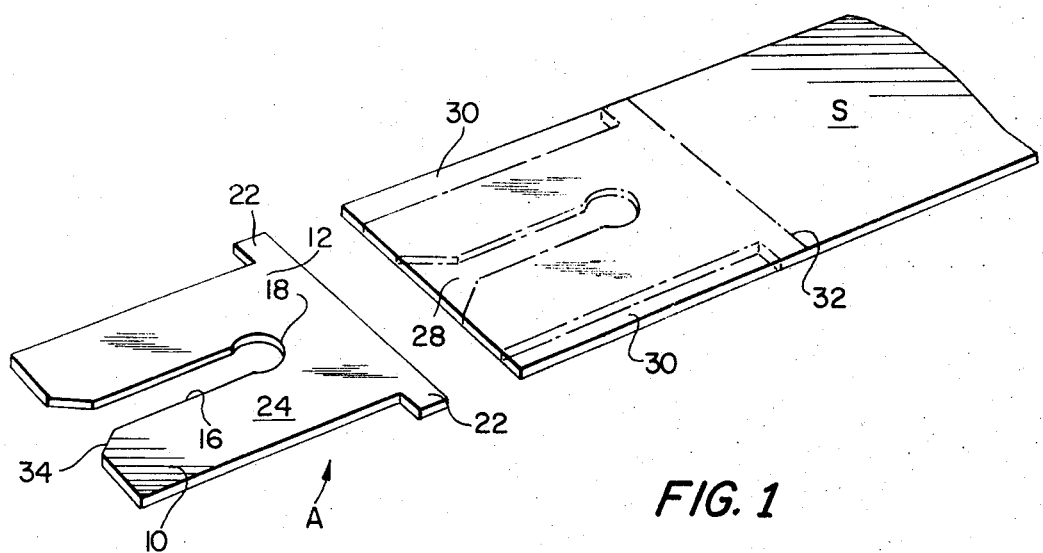
FIG. 1 is a perspective view illustrating a method of making connecting devices in accordance with one embodiment of the invention.
Figures 2, 3:
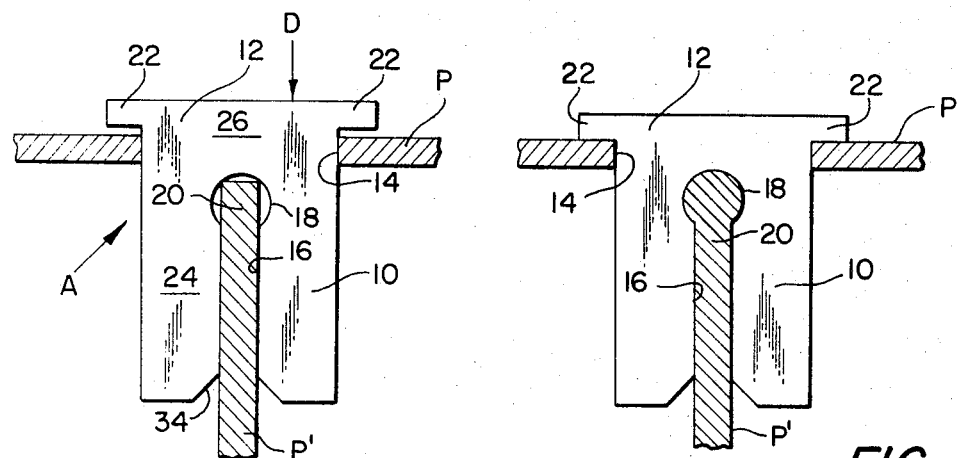
FIG. 2 is a front elevational view showing the device related to two plates to be fastened together.
FIG. 3 is a front elevational view of the elements shown in FIG. 2, this view showing the parts as finally assembled.
Figure 4:
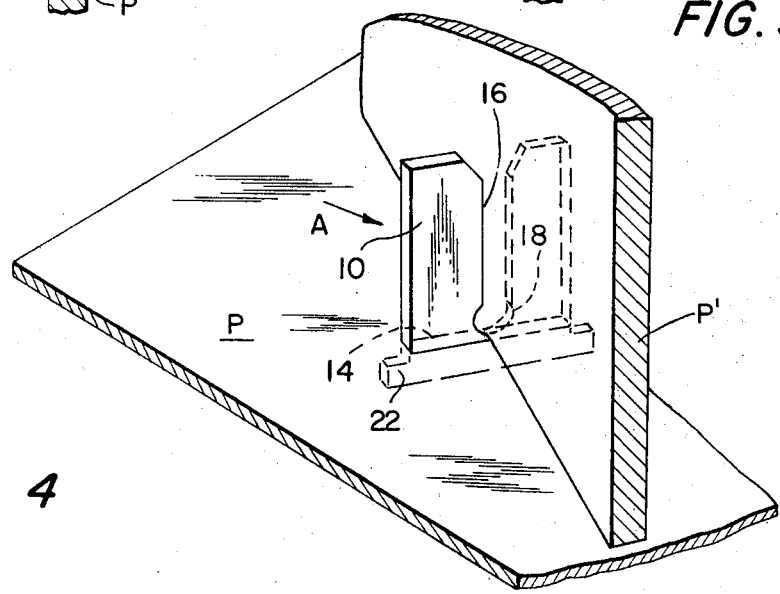
FIG. 4 is a perspective view of the device in assembled relation with two plates.

FIGS. 1 – 4 illustrate one embodiment of the invention from the standpoint of the product and a method for making the product. A fastener or connector device A comprises a shank 10 and a head 12. The shank is adapted to be inserted into an opening 14 in a first plate P and the head is adapted to limit the insertion of the shank into the opening. The shank 10 is provided with a slot 16 which is adapted to receive the marginal portion of a second plate P'. As shown, the slot 16 has parallel surfaces adapted to laterally support the second plate and is widened in the vicinity of its base 18. The base is spaced a predetermined distance from the head whereby upon the maximum insertion of the shank in the opening (FIG. 3), which corresponds to an abutment position of the head 12 and the plate P and an abutment position of the two plates, the portion 20 of the second plate is locally deformed to increase its lateral dimension in the area 18 of the base to effect the connection of the parts. The deformation of the portion 20 and the connection of the plates P and P' occurs when the head 12 is hammered in the direction D to cause the device to move from the position of FIG. 2 to the position of FIG. 3.

As shown, the head 12 comprises opposite projections 22 which extend laterally from and at the top of each side of the shank 10. The head 12 has one dimension substantially equal to the thickness of the shank. The opposite faces 24 of the shank are substantially parallel and the head has opposite sides 26 which lie substantially in the same plane as the faces of the shank.

The described connecting device or fastener is made from flat strip stock. As shown in FIG. 1, a strip S of hard or non-malleable metal, such as high carbon steel, for example, SAE 1060 steel, preferably is fed through a progressive die where it is subjected to simple punching operations to remove substantially keyhole shaped sections 28 to provide the slots 16. The term "keyhole shaped" is intended to refer to a slot having a widened base. It is not essential that the slot be of symmetrical contour. Also, the strip is punched to remove substantially rectangularly shaped sections 30 at regular intervals, these sections being punched from the strip along the longitudinal edge at each side of the strip to provide the laterally extending shoulders or projections 22. The keyhole shaped sections are punched from the strip on the central longitudinal axis thereof. The strip thus punched is severed at regular predetermined intervals or at a predetermined distance from where the substantially rectangularly shaped sections are punched from the strip. The lines of severance 32 provide an open end for the substantially keyhole shaped slots 16 at the end opposite the end having the widened base 18. To facilitate entry of a plate into the slot, the slot may be provided with a lead-in 34 at its entrance.

In the described embodiment of the invention, the opening 14 in the plate P is rectangular to receive the rectangular cross-section or shape of the shank 10.

Figure 5:
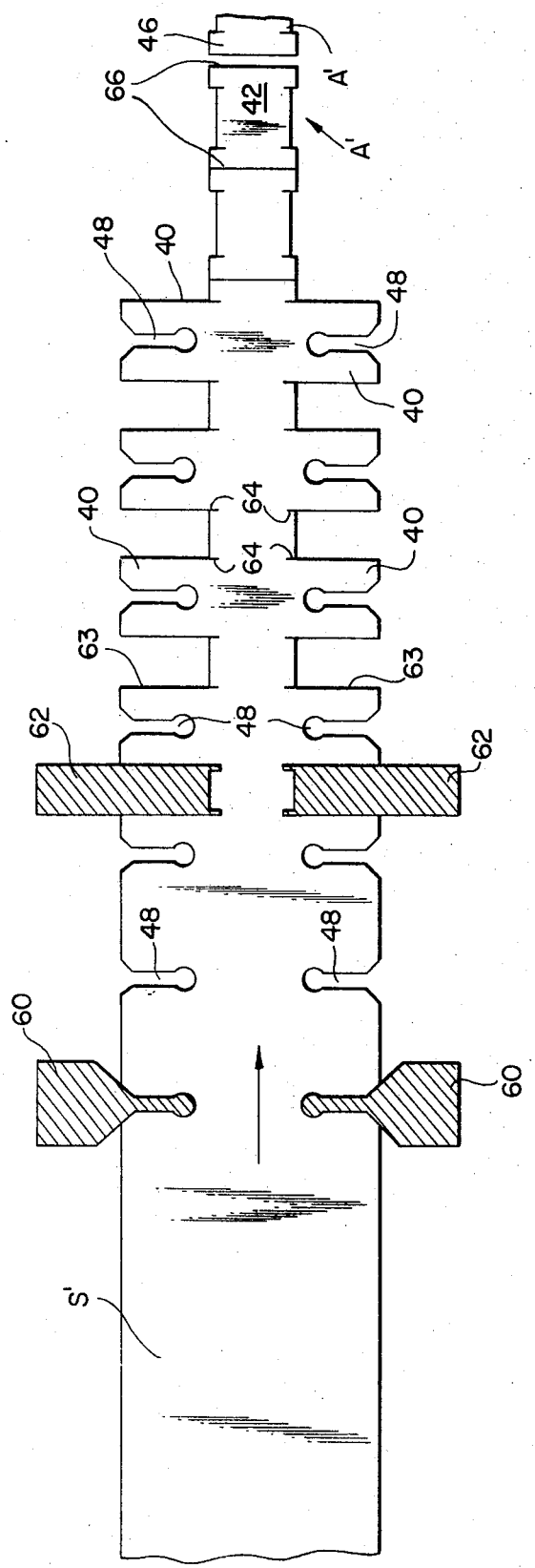
FIG. 5 is a top plan view illustrating a method of making connector devices in accordance with another embodiment of the invention.

The second embodiment of the invention is illustrated in FIGS. 5, 6 and 7. As shown in FIG. 6, the connecting device A' comprises a pair of shanks 40 which are integrally connected to one another by a bridging portion 42. As shown, the shanks extend from the same side of the bridging portion and are in spaced, substantially parallel relationship. In this embodiment of the invention the head 44 comprises a lateral extension 46 at each side of the bridging portion to provide a projection at opposite sides of the spaced, connected shanks 40. Each of the shanks 40 is of essentially the same structure as previously described. Each shank is provided with a slot 48 having a widened area 50 in the vicinity of its base, and the base is spaced a predetermined distance from the head 44. Also, to facilitate the insertion of a plate in the slot, a lead-in 52 is provided at the entrance to each slot.

A method for manufacturing the product shown in FIG. 6 is illustrated in FIG. 5. A strip S' is preferably fed through a progressive die where the strip is subjected to a series of punching operations. The strip is notched by punches 60 at the first station to furnish opposite aligned slots 48 of the substantially key-hole shape or configuration. Substantially rectangularly shaped sections are punched from the strip at a second station by punches 62 on oppsite sides of the strip so that the strip has aligned pairs of openings 63 alternated with the slots 48. As shown, shanks 40 are provided on each side of the strip in longitudinal spaced relationship. The strip is then subjected to a bending operation. A pair of shanks 40, one on each side of the strip, are bent to extend substantially perpendicularly to the plane of the strip so that the shanks are in substantial parallelism. To facilitate the bending operation the punches 62 may be formed to provide notches or slits 64 adjacent the corners of the punched areas 63. After the bending operation, the strip is severed at 66 to provide the connector devices A'.

As previously indicated and as shown in FIG. 7 the double shank form of connector device A' is useful where it is desired that the plate P be provided with round holes or openings 70 for the insertion of the shanks 40 therethrough. Also, the double shank form of device furnishes twice the holding power of a single shank having the same material thickness.

A connector device made of one-quarter inch rod in accordance with the aforesaid Friedling et al. patent furnishes a holding strength of 240 pounds. A double shank device made in accordance with the invention of 0.32 inch SAE 1060 steel strip furnishes a holding strength of 160 pounds. However, the cost of manufacturing the product is approximately one-fifth the cost of manufacturing the prior art device.

While two preferred embodiments of the invention have been shown and described it will be understood and apparent to those skilled in the art that various changes and modifications may be made without departing from the spirit and scope of the invention as sought to be defined in the following claims.

We claim:

1. A device for connecting two plates comprising a shank adapted to be inserted into an opening in a first plate and a head adapted to limit the insertion of the shank into the opening, the shank and head being integrally formed from flat strip stock, a slot in the shank adapted to receive a marginal portion of a second plate, the slot having parallel surfaces adapted to laterally support the marginal portion of the second plate in said slot and being widened in the vicinity of its base, the base of the slot being spaced from the head a distance greater than the thickness of the first plate and the device being of a hardness whereby upon the maximum insertion of the shank in the opening corresponding to an abutment position of the head and the first plate and an abutment position of the two plates, the portion of the second plate received in the slot will be locally deformed in the area of the base to increase its lateral dimension.

2. A device according to claim 1, wherein the head comprises a projection extending laterally from each side of the shank, and the head has a dimension substantially equal to the thickness of the shank.

3. A device according to claim 2, wherein opposite faces of the shank are substantially parallel and the head has opposite sides which lie substantially in the same planes as said faces.

4. A device according to claim 1, wherein a second shank is integrally connected to the first named shank by a bridging portion, the shanks extending from the same side of the bridging portion, the second shank being similarly slotted with the slot widened in the vicinity of the base and the base spaced from the head.

5. A device according to claim 4, wherein the shanks are in spaced, substantially parallel relationship.

6. A device according to claim 5, wherein the head comprises a lateral extension at each side of the bridging portion to provide a projection at opposite sides of the connected shanks.

7. A device according to claim 6, wherein the thickness of each of the shanks of the bridging portion and of the extensions are substantially equal.

* * * * *